United States Patent
Hughes et al.

(10) Patent No.: US 9,465,799 B2
(45) Date of Patent: Oct. 11, 2016

(54) SERVER-SIDE INTERNATIONALIZATION AND LOCALIZATION OF WEB APPLICATIONS USING A SCRIPTING LANGUAGE

(75) Inventors: Shannon Ray Hughes, Fuquay Varina, NC (US); Jason E. Rist, Denver, CO (US)

(73) Assignee: Red Hat, Inc., Raleigh, NC (US)

( * ) Notice: Subject to any disclaimer, the term of this patent is extended or adjusted under 35 U.S.C. 154(b) by 518 days.

(21) Appl. No.: 13/270,042

(22) Filed: Oct. 10, 2011

(65) Prior Publication Data

US 2013/0091425 A1 Apr. 11, 2013

(51) Int. Cl.
*G06F 17/24* (2006.01)
*G06F 17/28* (2006.01)
*G06F 17/30* (2006.01)
*G06F 17/27* (2006.01)

(52) U.S. Cl.
CPC ......... *G06F 17/289* (2013.01); *G06F 17/2735* (2013.01); *G06F 17/30893* (2013.01)

(58) Field of Classification Search
CPC ............ G06F 17/289; G06F 17/2827; G06F 17/2735; G06F 17/3089; G06F 17/30893; G06F 17/30896; G06F 17/30905; G06F 17/30902
USPC ........................................ 715/259, 264, 265
See application file for complete search history.

(56) References Cited

U.S. PATENT DOCUMENTS

| | | | |
|---|---|---|---|
| 7,441,184 B2 * | 10/2008 | Frerebeau et al. ............ | 715/234 |
| 7,607,085 B1 * | 10/2009 | Lassesen ....................... | 715/255 |
| 7,784,026 B1 | 8/2010 | Wong | |
| 2003/0084401 A1 * | 5/2003 | Abel ................. | G06F 17/30867 |
| | | | 715/205 |
| 2008/0133216 A1 * | 6/2008 | Togami ............................ | 704/4 |
| 2009/0192783 A1 * | 7/2009 | Jurach et al. ...................... | 704/4 |
| 2010/0286977 A1 * | 11/2010 | Chin et al. .................... | 715/256 |
| 2011/0218958 A1 * | 9/2011 | Warshavsky et al. .......... | 706/54 |
| 2012/0017146 A1 * | 1/2012 | Travieso et al. .............. | 715/265 |

OTHER PUBLICATIONS

Somerville, Matthew, "JavaScript Internationalisation by Matthew Somerville or: Why Rudolph is More Than Just a Shiny Nose", dated Dec. 9, 2007, 4 pages, http://24ways.org/2007/javascript-internationalisation.
Miller, Joshua I., Gettext—Javascript Implemenation of GNU Gettext API, Feb. 12, 2009, 10 pages, http://jsgettext.berlios.de/doc/html/Gettext.html.

(Continued)

*Primary Examiner* — Ariel Mercado
(74) *Attorney, Agent, or Firm* — Lowenstein Sandler LLP (57) ABSTRACT

A server computing system receives a request for a web page from a client that specifies a preferred language and searches mapping data stored in a local data store using a web page identifier in the request to locate one or more terms for the requested web page to be translated. The server computing system searches translations for web pages in the local data store for a sub-set of the translations that correspond to the terms for the requested web page in the specified language. The computer system generates a client-executable script to provide the sub-set of translations that correspond to the terms to the client and transmits the requested web page and the client-executable script having the sub-set of translations for the requested web page to the client. The client-executable script, when executed on the client, renders the web page in the specified language.

11 Claims, 5 Drawing Sheets

(56) References Cited

OTHER PUBLICATIONS

Pereira, JavaScript, 5 ways to call a function, http://devlicio.us/blogs/sergio_pereira/archive/2009/02/09/javascript-5-ways-to-call-a-function.aspx, posted on Feb. 9, 2009, 5 pages.

Refsnes Data, JavaScript Where To, <w3schools.com/js/js_whereto.asp>, published on Feb. 2011, 3 pages, Norwegian software development and consulting company.

Refsnes Data, JavaScript Functions, <w3schools.com/js/js_functions.asp>, published on Apr. 2009, 3 pages, Norwegian software development and consulting company.

* cited by examiner

SERVER-SIDE INTERNATIONALIZATION AND LOCALIZATION OF WEB APPLICATIONS USING A SCRIPTING LANGUAGE

TECHNICAL FIELD

Embodiments of the present invention relate to internationalization of web applications. Specifically, the embodiments of the present invention relate to server-side internationalization of web applications using a scripting language.

BACKGROUND

JAVASCRIPT code is often used to update/render specific areas of a web page by modifying the web page's current elements. JAVASCRIPT messages can be used to alert users of errors and other types of messaging that are separate from a web application server. At times, the JAVASCRIPT messages include text to be translated. Internationalization of web application pages, including JAVASCRIPT messages, involves developing the web application to be adapted to various languages and regions without having to make extensive application programming changes. Localization is the process of adapting an internationalized application for a specific region or language by adding locale-specific components and translating text. Internationalization and localization is often abbreviated to 'i18n'.

Conventional internationalization and localization solutions usually involve designing an application to reference resource libraries. Traditionally, an application's client-side code uses a 'gettext' client-side method to access a large resource library of translated strings, which is downloaded to the client from a server. A server sends all known translated strings to a client (in multiple locales) in the form of a resource library. Subsequently, the client looks up a translation of the components of the client-side code in the resource library and retrieves the translated strings from the library. Use of a large resource library on the client, however, results in an inefficient use of client resources. Clients needlessly download a library of thousands of translated strings, but utilize only a fraction of the library, using more network bandwidth than needed. For example, a client downloads five thousand translated strings and searches thousands of translated strings, when needing to retrieve, for example, only 20 translated strings for a web application page. In another example, a client does not need many of the locales that are provided by a large resource library. Some traditional solutions use JSON (JAVASCRIPT Object Notation) data structures to hold translations for all locales on the client. The JSON format is often used for serializing and transmitting structured data over a network connection and is primarily used to transmit data between a server and a web application. As an application grows, the resource library of translated strings also grows, and the use of JSON leads to scalability issues. The installation of a large resource library on the client and the use of the JSON format increases the bandwidth needed to support the client, which creates more strain on a server since many clients are talking to the same server.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for server-side translation of web pages using a script language. A server computing system receives a request for a web page from a client that specifies a preferred language. The server computing system searches mapping data stored in a local data store using a web page identifier in the request to locate one or more terms for the requested web page to be translated. The server computing system searches a translations for web pages in the local data store for a sub-set of the translations that correspond to the one or more terms for the requested web page in the specified language. The computer system generates a client-executable script to provide the sub-set of translations that correspond to the one or more terms to the client and transmits the requested web page and the client-executable script having the sub-set of translations for the requested web page to the client. The client-executable script, when executed on the client, renders the web page in the specified language.

Embodiments of the present invention greatly reduce the amount of work which client web browsers perform with regards to displaying text to support internationalization and localization efforts. Embodiments perform server-side creation of script, such as JAVASCRIPT code, that translates only the locales and the translated strings that are needed by the client for a particular web page and sends a dynamic script (e.g., JAVASCRIPT code) containing the translations to the client. Embodiments provide a scalable solution and eliminate unnecessary wasted bandwidth associated with data that is not going to be used on a client.

Figure 1:
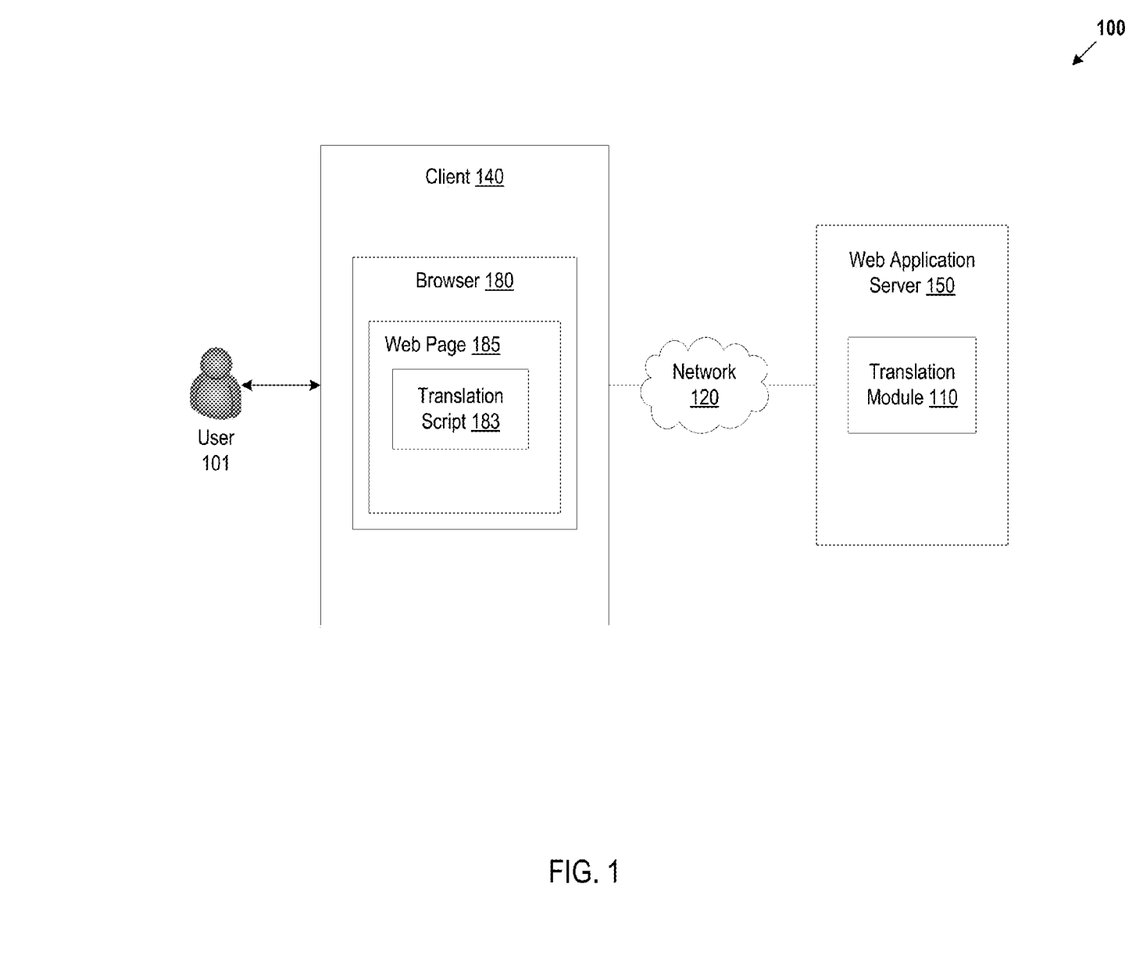
FIG. 1 is an exemplary network architecture in which embodiments of the present invention may operate.

FIG. 1 is an exemplary network architecture 100 in which embodiments of the present invention can be implemented. The architecture 100 includes a web application server 150 coupled to one or more clients 140 via a network 120. A client 140 can be hosted by any type of computing device including server computers, gateway computers, desktop computers, laptop computers, mobile communications devices, cell phones, smart phones, hand-held computers, or similar computing device. The network 120 can be a public network (e.g., Internet) or a private network (e.g., a local area network (LAN)).

A user 101, such as a web user, can use a client 140 to access Internet data hosted by a web application server 150. A web application server 150 can be hosted by any type of computing device including server computers, gateway computers, desktop computers, laptop computers, hand-held computers or similar computing device. For example, the user 101 may wish to reserve an airline flight using the Internet and may access the web page 185 of an airline to search for a flight and purchase a ticket. The client 140 can access one or more web pages 185 using a browser 180, or a similar web-page rendering application, to retrieve a web page 185 from a web application server 150 and render the retrieved web page 185 on the client 140. A browser 180 can be configured by a user 101 for a default or preferred language preference settings. The language preference settings, hereinafter referred to as "locale", may be automatically set in the web browser configuration automatically (based on the client location or the language used by a user) or based on a user's preferences. In addition, a web page 185 can present a user 101 with a number of different country options for translating the web page 185.

The web application server 150 can include a translation module 110 to receive an initial request for a web page 185 from a web browser 180 for a particular web page 185. The translation module 110 can generate translation script 183 for the requested web page 185 and transmit the translation script 183 and the requested web page 185 to the browser 180 via the network 120. The translation script 183 can be client-side JAVASCRIPT code to run on a client 140. The translation script 183 can include the translations needed by a browser 180 for a particular locale. The browser 180 can receive the web page 185 and the translation script 183 and load the web page 185. When the translation script 183 is executed by the browser 180, the translation script 183 can dynamically load the translations for the web page 185 on demand to render the web page 185 in an appropriate language.

Thus, the client 140 can use a minimal amount of client resources (e.g., memory, storage space, network bandwidth, etc.) by receiving a translation script 183 from a server 150 for a particular web page 185 and storing and executing the translation script 183 corresponding to particular web pages 185, rather than locally storing an entire library of translations in various languages.

Figure 2:
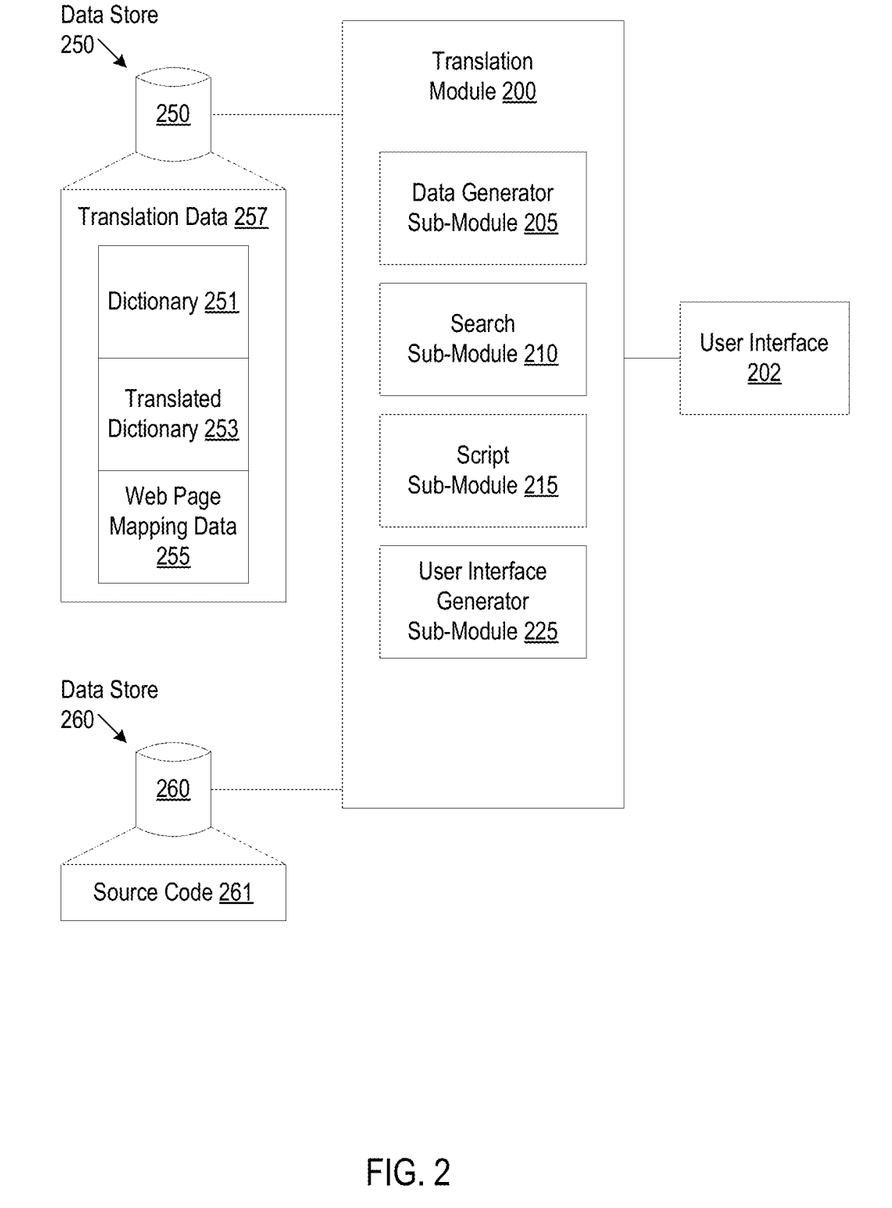
FIG. 2 is a block diagram of one embodiment of a translation module.

FIG. 2 is a block diagram of one embodiment of a translation module 200 for server-side translation of web pages. In one embodiment, the transaction manager module 200 can be the same as the translation module 110 hosted by a server 150 of FIG. 1. The translation module 200 can include a data generator sub-module 205, a search sub-module 210, a script sub-module 215, and a user interface (UI) generator sub-module 225.

One or more users, such as web application developers, can develop web pages for a web application. The web pages can include strings that should be translated. The data generator sub-module 205 can search for indicators in the source code 261 for the web pages, which indicate that a translation is required for one or more strings, and generate a dictionary 251 based on the indicators and strings. The source code 261 can be stored in a data store 260 that is coupled to the translation module 200. The dictionary 251 can be a flat file, relational database, spreadsheet, or the like, and stored in a data store 250. A data store 250,260 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The data generator sub-module 205 can generate and send a request to a translator to translate the dictionary 251. The request can include the dictionary 251 and can also specify which languages to translate the dictionary 251 to. In one embodiment, the translator is an automated translation service provided by a service provider and/or provided by a translation application or translation tool. In one embodiment, the translation service provider specifies the languages to be used for translation. In one embodiment, the translator is hosted by the same computing system that hosts the data generator sub-module 205. In another embodiment, the translator is hosted by a computing system that is separate from the computing system that hosts the data generator sub-module 205 and the data generator sub-module 205 communicates with the translator via a network. In another embodiment, the translator is one or more users that provide a translation service and the data generator sub-module 205 can receive user input of a translation result from the users via the user interface 202. The user interface 202 can be a graphical user interface. The user interface generator sub-module 225 can generate the user interface 202.

The data generator sub-module 205 can receive a translation result from the translator and store the translation result as a translated dictionary 253 in the data store 250. The translated dictionary 253 can include the strings and values for the strings. The values can be the translation of the string in different languages.

The data generator sub-module 205 can use the strings in the translated dictionary 253 as keys to search the translated dictionary 253. The data generator sub-module 205 can generate and store web page mapping data 255 that contains web page identifiers and the keys that correspond to the web page identifiers. Examples of a web page identifier can include, and are not limited to, a uniform resource locator (URL) and IP address. The data generator sub-module 205 can generate the web page mapping data 255 based on the web pages developed by the web application developers. For example, web mapping data 255 may include a URL and/or IP address for an account login web page and the keys of the terms to be translated in the account login web page, such as 'login', 'username', 'password', 'forgot password', and 'submit'.

The search sub-module 210 can receive a request for a web page of a web application from, for example, a web browser, and can access the stored web page mapping data 255 and translated dictionary 253 to provide the web browser the values of the terms to be translated in the requested web page. The search sub-module 210 can locate a web page identifier in the request and search the web page mapping data 255 for a matching web page identifier and determine which keys are associated with the web page identifier. The search sub-module 210 can use the keys and a locale identifier in the request to search the translated dictionary 253 for the translation values that correspond to the keys in the language as specified by the locale identifier.

The script sub-module 215 can generate a dynamic script, such as JAVASCRIPT code, that includes the translation values that correspond to the keys and send the script and the requested web page to the web browser as a response to the web page request. The script can provide all the translations needed for the requested web page in the specific locale, as specified in the request. The web browser can load the web page and use the script to render the web page with the translations. The script sub-module 215 can design the script to run immediately when the web page is loaded. A script can run before render, as well as while rendering. In one embodiment, the script sub-module 215 generates script code (e.g., JAVASCRIPT code) for a function embedded in an external file (e.g., .js file). The external file is a file that is separate from the requested web page. The script sub-module 215 can send the file and the requested web page to the client. In one embodiment, web application developers include a reference to the file in a section (e.g., HEAD section) of code of the web page, and when the client loads the requested web page, the web page can call the function in the external file and reference the translation values provided from calling the external file to render the web page in the appropriate language.

In another embodiment, the script sub-module 215 generates script code and modifies the source code of the requested web page by embedding the script code in the source code for the requested web page. The script sub-module 215 can send the requested web page, which is modified to include the script code, to the client. When the client loads the modified code for the requested web page, the web page can execute the script code to render the web page in the appropriate language.

For example, a user may wish to access an airline account log in web page for access to airline data to purchase an airline ticket. The search sub-module 210 receives a request for an account login web page from the browser. The request includes the web page identifier "https://secure.example.com/account/login.html" and the locale identifier "fr" to represent the French language preference. The search sub-module 210 uses the web page identifier to search the mapping data 255 for the keys that are associated with web page identifier for the account login web page. The mapping data 255 indicates that five keys, such as 'login', 'username', 'password', 'forgot password', and 'submit' are associated with the web page identifier for the account login web page. The keys represent the terms in the account login web page which should be translated. The search sub-module 210 uses the keys to search the translated dictionary for the values that correspond to the French translations for the keys and the script sub-module 215 generates a dynamic script (e.g., JAVASCRIPT code) that, when executed, provides the five translation values and sends the script, for example, embedded as part of the rendered account login web page, to the web browser. The web browser can use the dynamic script to render the five translation values in the account login web page.

Figure 3:
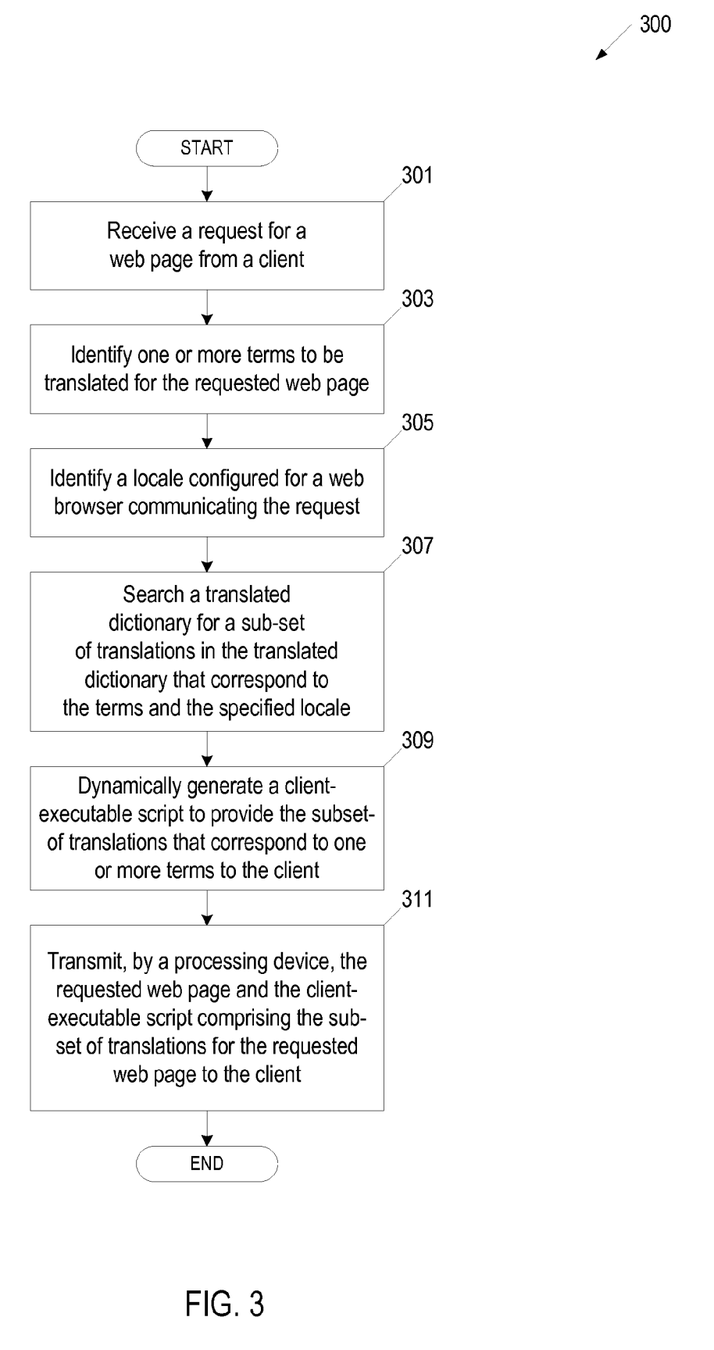
FIG. 3 is a flow diagram of an embodiment of a method for server-side translation of web pages.

FIG. 3 is a flow diagram of an embodiment of a method 300 for server-side translation of web pages. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the translation module 110 hosted by a server 150 of FIG. 1.

At block 301, the translation module receives a request for a web page. The request can be from a client, such as a web browser, or similar web-page rendering application. The request can be a HTTP (Hypertext Transfer Protocol) request. At block 303, the translation module identifies one or more terms to be translated for the requested web page. The translation module can search mapping data that is stored in a data store that is coupled to the translation module using a web page identifier in the request to determine which keys correspond to the web page identifier. The keys represent terms in the web page that should be translated. The keys can be strings. Examples of a web page identifier can include, and are not limited to, a uniform resource locator (URL) and an IP address.

With the request, the web browser sends information about language preference settings. These are preferences about the preferred language for one or more web pages. The language preference settings, hereinafter referred to as "locale", may be automatically set in the web browser configuration based on a user's preferences. At block 305, the translation module determines the locale for which the web browser is configured from the request. The request can include a locale identifier, such as an i18n (internationalization and localization) country code identifier. The part of the HTTP request that can hold the locale identifier (language preference information) can be an Accept-Language request-header. Alternatively, a web page may present translation options to a user and a user may select a translation that may be different from a web browser's configuration. For example, a web page can present a user with a number of different country options for translating the web page, such as Belgium, Greece, Russia, United Arab Emirates, China, Hong Kong, Japan, etc. The request can include a locale identifier based on the user selection.

At block 307, the translation module uses the keys and the locale identifier to search a translated dictionary that is stored in the data store for a sub-set of translations in the translated dictionary that correspond to the terms for the requested web page in the specified language. The translated dictionary is a collection of translated terms for the web pages of one or more web applications. The sub-set of translations can include the translation values that correspond to the keys in the language as specified by the locale identifier. At block 309, the translation module dynamically creates a script, such as JAVASCRIPT code, that when executed, provides the translation values for the web page. The script can be dynamically generated by the translation module in response to receiving a request (e.g., an initial request) for a web page. The script can be dynamic client-executable script that executes at run-time. The translation module can use a template that is stored in the data store to generate the script. At block 311, the translation module sends the requested web page and the script for the requested web page, for example, in an external file (e.g., .js file) or embedded as part of code of the requested web page, to the client. The translation module can transmit the requested web page and the script to the client over a network. The script, when executed by the client, provides the translation values for a web browser to use to render the web page in the specified language.

For example, the translation module receives a request for a password creation confirmation web page. The request includes the web page identifier "https://secure.example.com/passwordcreation.html" and the locale identifier "de" to represent the German language preference. The translation module uses the web page identifier to search the mapping data for the keys that are associated with the password creation confirmation web page. The mapping data indicates that five keys, such as 'password_match', 'very_weak', 'weak', 'good', 'strong', and 'meterText' are associated with the web page identifier for the password creation confirmation web page. The keys represent the terms in the password creation confirmation web page which should be translated. The translation module uses the keys to search a translated dictionary for the values that correspond to the German translations for the keys (e.g., 'password_match', 'very_weak', 'weak', 'good', 'strong', and 'meterText'). The translation module generates a script (e.g., JAVASCRIPT code) that provides the translation values and sends it to the web browser. The web browser can load the requested web page and execute the dynamic script to render the password creation confirmation web page using the German translations of 'password_match', 'very_weak', 'weak', 'good', 'strong', and 'meterText'.

Figure 4:
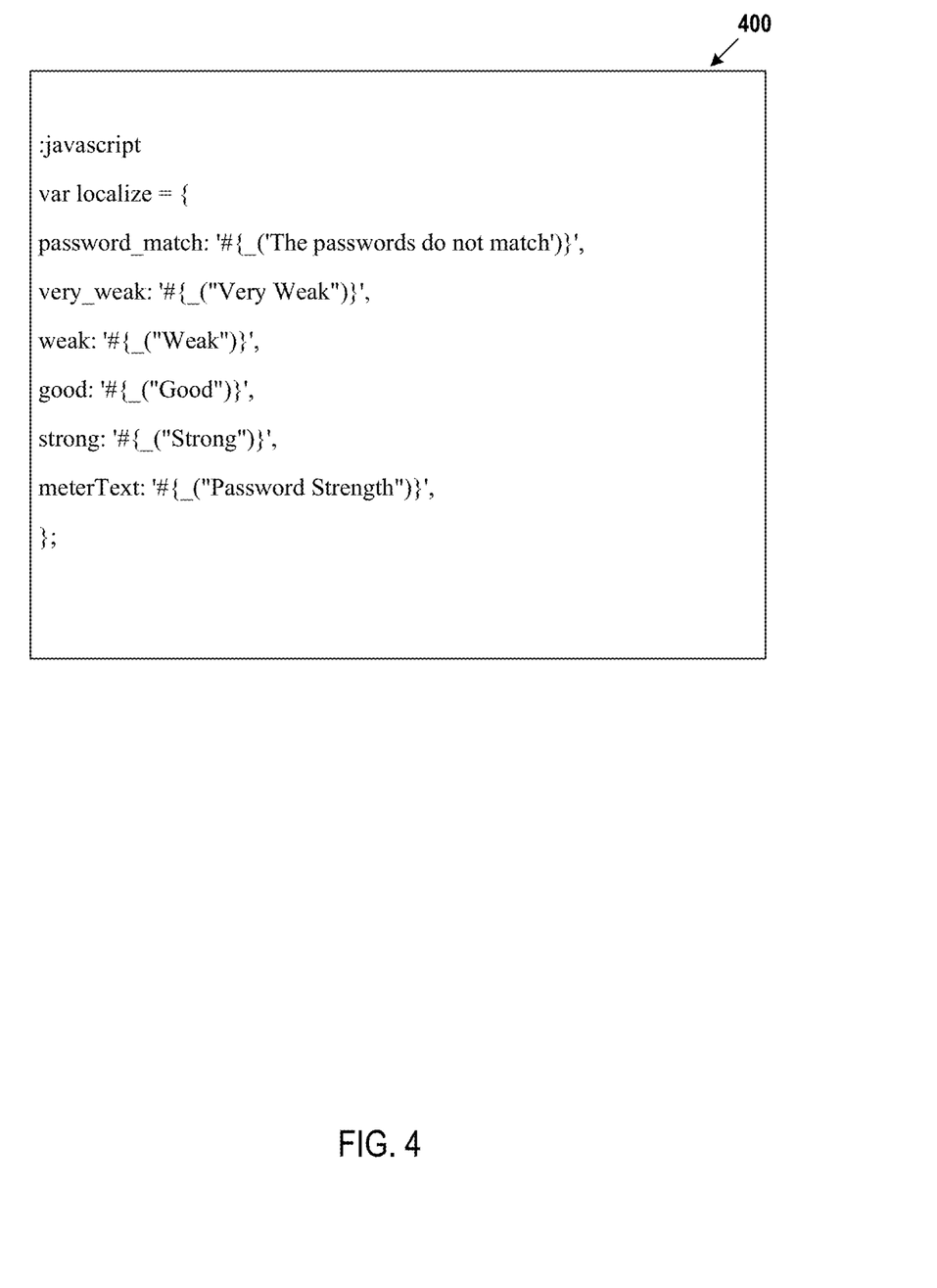
FIG. 4 is a block diagram of exemplary client-executable script that is generated on a server and transmitted to a client for translation of a web page.

FIG. 4 is a block diagram of an exemplary client-executable script 400 that is dynamically generated by a translation module on a server and sent to a client for the client to use to render a web page with the appropriate translations. The translation module can dynamically generate the client-executable script 400 in response to receiving a request, such as an initial request during a session, for the web page. The client-executable script 400 is used to create a JAVASCRIPT variable named 'localize'. The client-executable script 400 can be executed by a client after the client receives the server response delivering the client-executable script 400 from the initial client request for the web page. When executed by a browser on the client, the client-executable script 400 provides the translation values of the terms in a web page to the web browser, which can then render translated text for the web page.

Figure 5:
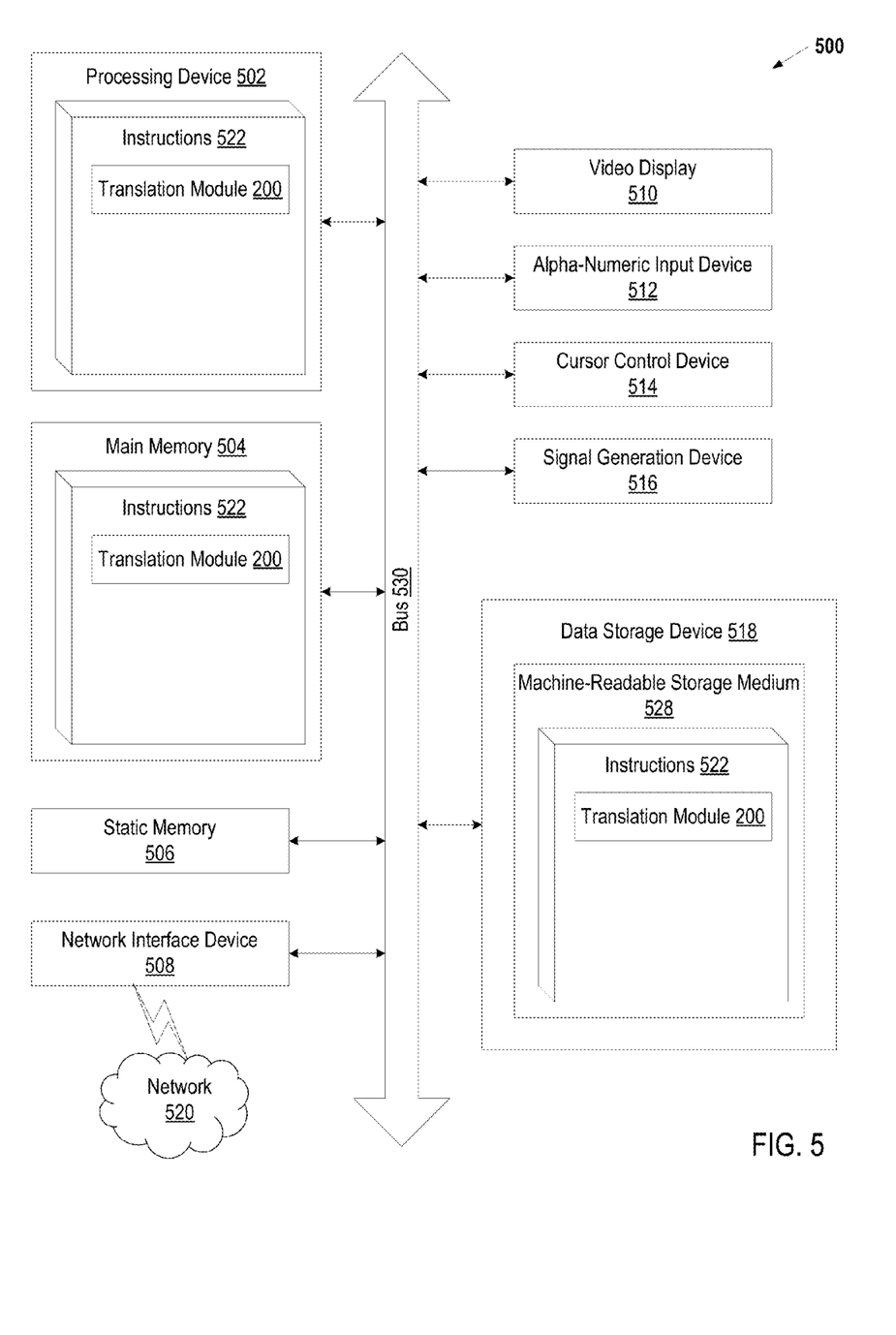
FIG. 5 is a diagram of one embodiment of a computer system for server-side translation of web pages.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one embodiment, the instructions 522 include instructions for a translation module (e.g., translation module 200 of FIG. 2) and/or a software library containing methods that call a translation module. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for server-side translation of web pages using a script language are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "searching" or "transmitting" or "generating" or "embedding" or "modifying" or "translating" or "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   receiving a request for a web page from a client web browser, the request comprising a locale identifier that specifies a preferred language and a web page identifier;
   searching mapping data stored in a local data store associating web page identifiers with keys that correspond to the web page identifiers to identify one or more keys mapped to the web page identifier, the one or more keys being identifiers of translatable terms within a plurality of web pages;
   searching, within the local data store, to identify a sub-set of a plurality of translations that corresponds to one or more translatable terms in the requested web page, wherein the sub-set is identified using the locale identifier and the one or more keys;
   dynamically generating a client-executable script to provide the sub-set of translations that correspond to the one or more terms to the client web browser; and
   transmitting, by a processing device of a server, the requested web page together with the client-executable script comprising the sub-set of translations for the requested web page to the client web browser,
   wherein transmitting the requested web page together with the client-executable script comprises:
      transmitting the client-executable script in an external file that is separate from the web page; and
      embedding a reference to the external file in a section of code of the web page, wherein, when the web page is loaded by the client web browser, the client-executable script in the external file is executed to render the web page in the preferred language associated with the locale identifier.

2. The method of claim 1, further comprising:
   searching for indicators in source code for the plurality of web pages indicating terms in the plurality of web pages to be translated;
   generating a dictionary comprising the terms to be translated for the plurality of web pages;
   translating the dictionary in a plurality of languages to generate the plurality of translations for the plurality of web pages; and
   storing the plurality of translations in the plurality of languages for the plurality of web pages in the local data store.

3. The method of claim 1, wherein searching to identify the sub-set of the plurality of translations comprises:
   searching for translation values that correspond to the one or more terms in view of the locale identifier in the request, the translation values being translations of terms for the requested web page in a language associated with the locale identifier.

4. The method of claim 1, wherein the web page identifier is a uniform resource locator.

5. A system comprising:
   a memory to store a plurality of translations of terms for a plurality of web pages; and
   a processing device operatively coupled to the memory to:
      receive a request for a web page from a client web browser, the request comprising a locale identifier that specifies a preferred language and a web page identifier;
      search mapping data stored in a local data store associating web page identifiers with keys that correspond to the web page identifiers to identify one or more keys mapped to the web page identifier, the one or more keys being identifiers of translatable terms within a plurality of web pages;
      search, within the local data store, to identify a sub-set of a plurality of translations that corresponds to one or more translatable terms in the requested web page, wherein the sub-set is identified using the locale identifier and the one or more keys;
      dynamically generate a client-executable script to provide the sub-set of translations that correspond to the one or more terms to the client web browser; and
      transmit the requested web page together with the client-executable script comprising the sub-set of translations for the requested web page to the client web browser,
      wherein to transmit the requested web page and the client-executable script the processing device is to:
         transmit the client-executable script in an external file that is separate from the web page; and
         embed a reference to the external file in a section of code of the web page, wherein, when the web page is loaded by the client, the client-executable script in the external file is executed to render the web page in a language associated with the locale identifier.

6. The system of claim 5, wherein the processing device is further to:
   search for indicators in source code for the plurality of web pages indicating terms in the plurality of web pages to be translated;
   generate a dictionary comprising the terms to be translated for the plurality of web pages;

translate the dictionary in a plurality of languages to generate the plurality of translations for the plurality of web pages; and store the plurality of translations in the plurality of languages for the plurality of web pages in the local data store.

7. The system of claim 5, wherein, to search to identify the sub-set of the plurality of translations, the processing device is further to:

search for translation values that correspond to the one or more terms in view of the locale identifier in the request, the translation values being translations of terms for the requested web page in a language associated with the locale identifier.

8. The system of claim 5, wherein the web identifier is a uniform resource locator.

9. A non-transitory computer-readable storage medium including instructions that, when executed by a processing device of a server, cause the processing device to:

receive a request for a web page from a client web browser, the request comprising a locale identifier that specifies a preferred language and a web page identifier;

search mapping data stored in a local data store associating web page identifiers with keys that correspond to the web page identifiers to identify one or more keys mapped to the web page identifier, the one or more keys being identifiers of translatable terms within a plurality of web pages;

search, within the local data store, to identify a sub-set of a plurality of translations that corresponds to one or more translatable terms in the requested web page, wherein the sub-set is identified using the locale identifier and the one or more keys;

dynamically generate a client-executable script to provide the sub-set of translations that correspond to the one or more terms to the client web browser; and transmit the requested web page together with the client-executable script comprising the sub-set of translations for the requested web page to the client web browser, wherein to transmit the requested web page and the client-executable script, the instructions, when executed by the processing device of the server, further cause the processing device to:

transmit the client-executable script in an external file that is separate from the web page; and embed a reference to the external file in a section of code of the web page, wherein, when the web page is loaded by the client, the client-executable script in the external file is executed to render the web page in a language associated with the locale identifier.

10. The non-transitory computer-readable storage medium of claim 9, including further instructions that, when executed by the processing device, cause the processing device to:

search for indicators in source code for the plurality of web pages indicating terms in the plurality of web pages to be translated;

generate a dictionary comprising the terms to be translated for the plurality of web pages;

translate the dictionary in a plurality of languages to generate the plurality of translations for the plurality of web pages; and store the plurality of translations in the plurality of languages for the plurality of web pages in the local data store.

11. The non-transitory computer-readable storage medium of claim 9, wherein to search for the sub-set of the plurality of translations, the instructions, when executed by the processing device of the server, further cause the processing device to:

search for translation values that correspond to the one or more terms in view of the locale identifier in the request, the translation values being translations of terms for the requested web page in a language associated with the locale identifier.

* * * * *